E0152 XR 3,816,848

United States Patent [11] 3,816,848

Skinner [45] June 11, 1974

[54] AUTOMATIC FOCUS CONTROL FOR IMAGE PICKUP DEVICES

[75] Inventor: Kenneth Romayn Skinner, Fort Wayne, Ind.

[73] Assignee: The Magnavox Company, Fort Wayne, Ind.

[22] Filed: Mar. 29, 1972

[21] Appl. No.: 239,038

[52] U.S. Cl. ..............358/47, 178/DIG. 29

[51] Int. Cl. .............. H04n 9/06

[58] Field of Search ..... 178/DIG. 29, 5.4 R, 5.4 ST, 178/5.4 AC, 7.92, 7.2; 315/31 TV

[56] References Cited

UNITED STATES PATENTS

| | | | |
|---|---|---|---|
| 2,472,165 | 6/1949 | Mankin | 178/DIG. 29 |
| 2,571,306 | 10/1951 | Seegho | 178/DIG. 29 |
| 3,356,792 | 12/1967 | Peters | 178/DIG. 29 |
| 3,396,304 | 8/1968 | Wilson | 178/DIG. 29 |
| 3,409,799 | 11/1968 | Kurzweil et al. | 178/DIG. 29 |
| 3,450,833 | 6/1969 | Hobrough | 178/DIG. 29 |
| 3,509,275 | 4/1970 | Deeley et al. | 178/DIG. 29 |
| 3,647,952 | 3/1972 | Ball et al. | 178/DIG. 29 |
| 3,688,023 | 8/1972 | Kurokawa et al. | 178/5.4 ST |

*Primary Examiner*—Robert L. Richardson
*Attorney, Agent, or Firm*—T. A. Briody; W. W. Holloway; R. T. Seeger

[57] ABSTRACT

An improved one camera color television system having a feedback system for automatically controlling the electron beam focus within the camera tube is disclosed. A component of the color information output signals from the camera such as the color information carrier frequency is monitored, and a limiter-discriminator output voltage indicative of this frequency is employed to control a focusing element in the tube.

8 Claims, 9 Drawing Figures

AUTOMATIC FOCUS CONTROL FOR IMAGE PICKUP DEVICES

CROSS REFERENCE TO RELATED APPLICATIONS

The present invention has particular utility in a one camera color television system of the type disclosed in copending application, Ser. No. 831,029, now U.S. Pat. No. 3,647,943 entitled "Transducer System and Method," filed June 6, 1969 and Divisional application, Ser. No. 44,411, filed June 8, 1970, in the names of Alfred M. Nelson and Daniel J. Marshall and assigned to the assignee of the present invention. The present invention provides an alternate to the scheme proposed in copending application, Ser. No. 258,904, entitled Automatic Focus Circuit and System, filed June 1, 1972, in the name of Thomas W. Burrus and also assigned to the present assignee which is substantially less expensive than and only slightly less accurate than the system disclosed in the aforementioned alternate application.

BACKGROUND OF THE INVENTION

This invention relates to a system for automatically controlling the electron beam focus in an image pickup device, and more especially to such a system as applied to a single tube color camera system wherein the color information is encoded on one or more color carrier signals as part of the tube output. The primary purpose of the present invention is to maintain proper color output signal from the image pickup device and finds particular utility, for example, in a consumer color camera where automatic control obviates the need for a color monitor.

The automatic focus system of the present invention pertains to color image pickup systems where the color scene is optically focused on the photosensitive material of the pickup device through a set of color encoding filters. These filters are generally of the multiple layer interference type designed to pass certain wavelengths of light and to block others and are generally referred to as dichroic filters. In one embodiment of the present invention the filter is made up of a set of stripes of dichroic material separated by equal sized transparent stripes. The stripes are so oriented with respect to the direction of scan of the pickup device as to produce an amplitude modulated color carrier electrical output signal at a desired frequency. Two sets of stripes of dichroic material having dissimilar light passing characteristics may be employed to provide either two color carrier frequencies or a single color carrier frequency with phase encoding of the color information. The light passing through the filter is incident on the light sensitive target of a Vidicon or other image pickup device where it is transformed into video signals for recording or transmission. Video pickup devices typically employ an electron beam which is focused on this target to provide a signal indicative of the amount of light falling on the area of the target being sensed, and changes within the image pickup device which defocus the electron beam also causes a diminution in the amplitude of the color signals as well as a change in the frequency of the color carrier. Changes in amplitude, of course, may indicate information about the scene being viewed as well as a change in the focus of the image pickup device, and accordingly the amplitude of such signals is not a reliable indicator of the degree of focus of the electron beam, however, according to the teachings of the present invention the frequency of the color carrier signal is a reliable indicator of electron beam focus.

SUMMARY OF THE INVENTION

The present invention provides a system where the color monitor and operator adjustable focus control may be eliminated and replaced by an automatic feedback circuit which senses a component of the color information output signals such as the frequency of the color carrier and provides a focus control signal back to the image pickup device to correct for errors in focus.

Accordingly it is one object of the present invention to eliminate manual focus control from an image pickup device.

It is another object of the present invention to provide a feedback system for maintaining focus of an electron beam in an image pickup device.

It is a further object of the present invention to provide an economical color camera having automatic control.

Yet another object of the present invention is to provide a color camera not requiring a color monitor.

A still further object of the present invention is to control electron beam focus in an image pickup device in accordance with variations in a component of the image pickup device output.

Still another object of the present invention is to control electron beam focus in a color image pickup device in accordance with variations in the frequency of a color information carrier signal.

DESCRIPTION OF THE DRAWING

The foregoing as well as other objects and advantages of the present invention will appear more clearly from the following detailed disclosure read in conjunction with the accompanying drawings in which:

FIG. 6 illustrates the behavior of an electron in a combined magnetic focus field and magnetic deflection field.

DESCRIPTION OF THE PREFERRED EMBODIMENT

Figure 1:
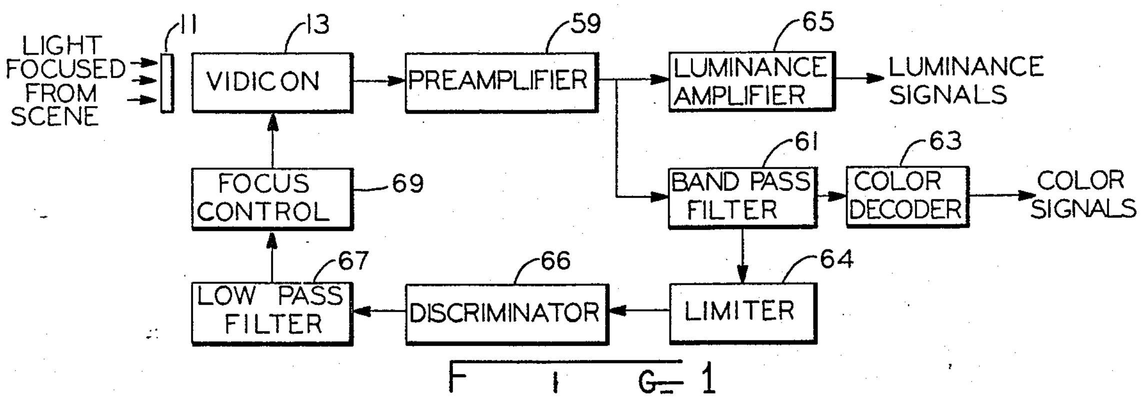
FIG. 1 is a block diagram of a one tube color camera system employing the automatic focus feedback circuit of the present invention.

FIG. 1 illustrates in block diagram form the present invention, which is seen to include a color encoding filter 11 through which light from a scene passes to the light sensitive element of an image pickup device 13.

Figure 3:
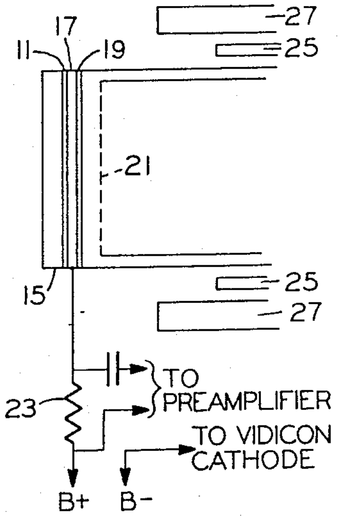
FIG. 3 illustrates a portion of an image pickup device suitable for the practice of the present invention.

While many types of image pickup devices might be employed, a Vidicon has been selected for the present preferred embodiment, and a portion of such a Vidicon is illustrated in FIG. 3.

The color encoding filter 11 is placed directly on the inner surface of glass face plate 15, which also has a transparent film 17 of conductive material thereon. The inner surface of the transparent conductive material in turn has a second extremely thin layer of photoconductive material 19 on which the electron beam from a cathode (not shown) is incident. A decelerating grid 21 serves to slow down the electron beam before it strikes the photoconductive material or target 19 so as to prevent secondary emission from that target. The resistance of the photoconductive material 19 is dependent upon its recent exposure to light, and thus this resistance controls the flow of electrons from the Vidicon cathode through the photoconductive material 19 to the conductive film 17 and down through a load resistor 23 through the power supply and back to the cathode. Thus the current flowing in the resistor 23 at a given instant is dependent upon the resistance of the particular small spot on the photoconductive material 19 on which the electron beam is focused.

The Vidicon type image pickup device has deflection coils 25 for providing the desired scan of the target 19, and a focusing coil 27 for focusing the electron beam on a small spot of the target 19. A focusing scheme is desirable since an electron beam will tend to diverge due to the repulsion between like charged particles making up that beam, and without such a focusing scheme the spot on which the beam is incident will be relatively large and diffused rather than sharp and small. A focusing coil 27 may be employed to provide a magnetic field along the axis of the Vidicon and coincident with the electron beam path when no deflection is present. Electrostatic focusing generally employing axially displaced coaxial tubes having dissimilar voltages thereon so as to form an electron lens in the region of their proximate ends may also be employed, and in the instance of the Vidicon both focusing schemes are employed. Either of these focusing schemes performs its intended function admirably when no deflection is applied to the electron beam, however, both of these focusing schemes introduce some error during the times the electron beam is being deflected, and those errors become more pronounced when the deflection becomes greater.

Figures 5, 6A, 6B, 6C, 7:
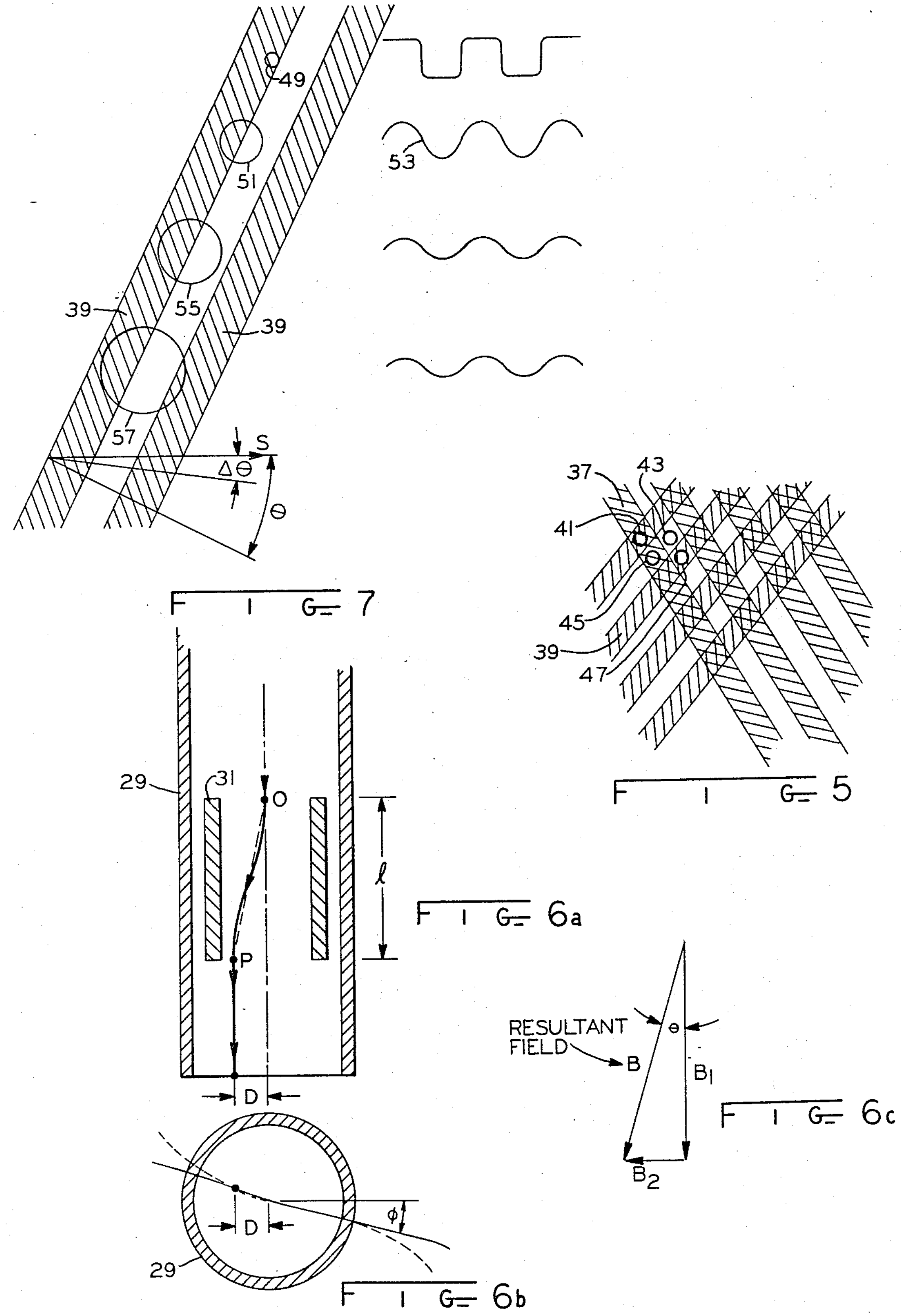
FIG. 5 depicts one pattern for the superimposed sets of strips of dichroic material to be employed as a color encoding filter for the present invention.
FIG. 7 illustrates a small segment of one of the sets of dichroic stripes on the color encoding filter illustrating scan direction relative to these stripes and the results of a change in this scan direction.

Magnetic focusing achieves its purpose by providing a magnetic field which is coaxial with the tube and which imparts to divergent electrons a helical motion which ideally brings all of the divergent electrons back to their desired path precisely at the time those electrons strike the target. FIG. 6*a* illustrates the action of the combined focus (29) and deflection (31) fields on an electron entering the deflection field at point O. Assuming the crossed fields are uniform and also that the transverse field is contained within the distance 1. The resultant magnetic field (B) is then at an angle $\theta$ with respect to the tube's axis and is dependent on the relative strengths of the two crossed fields $B_1$ and $B_2$. The electron will tend to follow the direction of the resultant field but in a helical motion as shown. If at point P (the end of the deflection field) the electron has made an integral number of revolutions through the helix, it will emerge with the same velocity and direction as it entered at point O. It can be shown that the amount of deflection for the above case is:

$$D = B\ (B_2/B_1)$$

Since $B_1$ (the focus field) is normally held constant, and $B_2$ (the deflection field) is varied at the desired scanning rate, the above equation is correct only if $B_1$ is continuously adjusted to maintain the integral number of revolutions of the helix. However, $B_1$ is normally large compared to $B_2$ and for small deflection angles ($\theta$) the equation holds approximately even though $B_1$ is held constant.

The equation shows the dependence on the amount of deflection to be inversely related to strength of the focus field. Thus for increasing focus coil currents the scan path decreases; whereas, for decreasing focus coil currents the scan path increases.

FIG. 6*b* shows that the electron beam is also deflected slightly in the vertical direction (the illustration is exaggerated) in a nonlinear fashion and increasing with higher transverse field strength $B_2$. This is caused by the force on an electron being perpendicular to the plane formed by the transverse field and the velocity of the electron. In vector notation the force is represented by the cross product formula:

$$f = eB \times v \qquad \text{newtons}$$

where $e$ = charge on electron (coulombs)
$b$ = magnetic flux density (webers 1 m$^2$)
$v$ = electron velocity (meters 1 sec.)

From FIG. 6*b* it can be seen that if the deflection D is changed due to focus field changes the average angle $\phi$ that the scan makes with the true horizontal will also change. It will be shown later that this change of scan angle results in only a small contribution to the effectiveness of the invention whereas, the variations of scan path length with focus variations play a major role.

Electrostatic focusing of an electron beam is accomplished by providing, for example, two axially displaced coaxial cylinders of dissimilar radii and providing a potential difference between the two cylinders to form a so called electrostatic lens in the area of the proximate ends of those cylinders. Such an electrostatic focusing scheme does not change the average angle which the actual scan path makes with a true horizontal line nor does it distort the ends of a single horizontal scan line as does the magnetic focusing field. A change in the electrostatic focusing potential will, however, effect the actual scan path length. If this potential difference is increased above the optimum focusing level, the scan path length will be increased, and similarly if this potential difference is below that required for an optimum focusing the scan path will be correspondingly less. This change in the length of a single horizontal scan line due to changes in either the magnetic or electrostatic focusing is relied on in the present invention to effect a feedback type of control on the electron beam focus.

FIG. 5 shows one color encoding filter suitable for the practice of the present invention. Such a filter has a first set of stripes 37 which, for example, may be a multiple layer interference type coating (dichroic) which are adapted, for example, to pass all portions of the visible spectrum except the reds and a second set of stripes of dichroic material 39 which are adapted to pass, for example, all portions of the visible spectrum except blue. The specific manner in which color information is encoded and decoded by this and similar color encoding filters is more fully discussed in the aforementioned application, Ser. No. 831,029, however, some discussion of this filter is required for a more complete understanding of the present invention.

The filter may be placed some distance away from the image pickup device target and the light passing through the filter focused onto that target as shown in the aforementioned copenidng application or, as illustrated in FIG. 3, the filter may be positioned sufficiently close to the target 19 that effectively both the filter and the target are simultaneously focused upon. FIG. 5 illustrates two pairs of television picture elements (the area covered at any one instant by the scanning electron beam) for two successive scan lines. It should be noted that picture element 41 is responsive to light having both the reds and the blues deleted from it due to the presence of dichroic stripe 37 superimposed on dichroic stripe 39 while picture element 43 is responsive to the entire visible spectrum. Picture element 45 receives light from a scene being viewed with only the reds deleted by dichroic stripe 37 while picture element 47 receives light from that scene with only the blues deleted due to dichroic stripe 39. The aforementioned copending application teaches that successive scan lines may be added together or subtracted in order to extract certain color information from the Vidicon composite output signal. Thus if picture elements 41 and 45 are subtracted the "red absent" information will be deleted since it is present in both picture elements while the "blue absent" information is present in picture element 41 but not in picture element 45, and accordingly will be present in the difference output. Similarly, subtracting picture elements 43 and 47 expunges the "red absent" information and saves the "blue absent" information. Similar processing will recover the remaining color information.

FIG. 5 also illustrates that the horizontal width of a stripe 37 is the same as the horizontal width of a stripe 39, and thus that these stripes encode the color information signals on a carrier, the frequency of which is determined by this horizontal stripe width and the horizontal scan rate. In other words if a picture element traverses 10 of the red blocking stripes 37 in one second the color carrier frequency would be 10 cycles per second. In practice the dichroic stripes are so dimensioned as to impart a 3.58 megacycle carrier to both the "red absent" and the "blue absent" color information.

The result of improper focus which in turn causes an improper television picture element size is illustrated in FIG. 7. Several different electron beam diameters or picture elements are illustrated superimposed on a portion of the color encoding filter illustrating for simplicity only a pair of the "blue absent" dichroic stripes 39. Assuming incoming white light of a uniform level, if the picture element is quite small relative to the width of a stripe such as picture element 49, the variations in Vidicon cathode current will be very nearly a square wave with sharply defined transitions corresponding to the time required for the picture element 49 to just pass from an entirely blue absent position to an entirely transparent position. If the picture element is about the same diameter as the horizontal stripe width such as illustrated by picture element 51 the output will approximate the sine wave carrier 53 with its amplitude, of course, dependent upon the magnitude of the light incident on the picture element at a given time. Picture elements 55 and 57 which exceed in diameter the horizontal width of a dichroic stripe yield similar somewhat sinusoidal output signals but of diminishing amplitude indicating a loss of color resolution. If the picture element encompasses several dichroic stripes the output signal will be essentially the average direct current output common to each of these wave forms. This common average direct current output is negative since the Vidicon connection to the B+ terminal is generally taken as the reference point.

It should be noted that each of the waveforms of FIG. 7 has the same basic frequency and this, of course, is due to our tacit assumption that each of the electron beam diameters 49, 51, 55, and 57 is moving at the same velocity across the color encoding filter. It should be remembered, however, that changes in either the electrostatic or magnetic focusing cause corresponding changes in the over-all length of a horizontal scan line. Since the time for one horizontal scan is fixed the picture elements must be moving more rapidly for longer scan lines and correspondingly more slowly for shorter scan lines. Thus excessive magnetic focus coil current will decrease the velocity of a picture element and correspondingly decrease the frequency of the color carrier signal. An inadequate focus coil current will increase the over-all length of a horizontal scan line and correspondingly increase the frequency of the color carrier signal. Analogously excessive electrostatic focus potential will increase the horizontal scan length and increase the color carrier frequency while inadequate electrostatic potential will decrease the scan length and color carrier frequency.

Returning now to FIG. 1, the output signal from the Vidicon 13 passes through a preamplifier 59 and then through a band pass filter 61 which is designed to pass signals in the neighborhood of the color carrier frequency such, for example, as 3.58 megacycles. These color signals may then be decoded by decoder 63 in accordance with the teaching in the aforementioned copending application, Ser. No. 831,029 for ultimate utilization either as recordings or color television transmissions. A luminance amplifier 65 may also be employed to supply corresponding intensity signals in accordance with the aforementioned application. The amplitude modulated color carrier signal passing through the band pass filter 61 is supplied to a limiter 64 which limits the signal amplitude to a value such as to expunge all of the color information from the carrier. The thus limited signal is then supplied to a discriminator 66 which functions to provide an output voltage which is proportional to the instantaneous frequency of its input signal. This voltage indicative of frequency is then passed through a low pass filter 67 which functions to prevent the feedback system from oscillating and also to provide an averaging effect on minor and rapid frequency variations such, for example, as might be caused by the individual scan lines of FIG. 6 which, since they are nonlinear, may cause frequency variations within a single horizontal scan. In other words, velocity variations of a picture element within a given scan line are averaged by the filter 67. The thus filtered frequency indicative voltage is supplied to an appropriate focus control circuit for varying either the current in the focusing coil or the potential on the electrostatic lens system.

Figure 2:
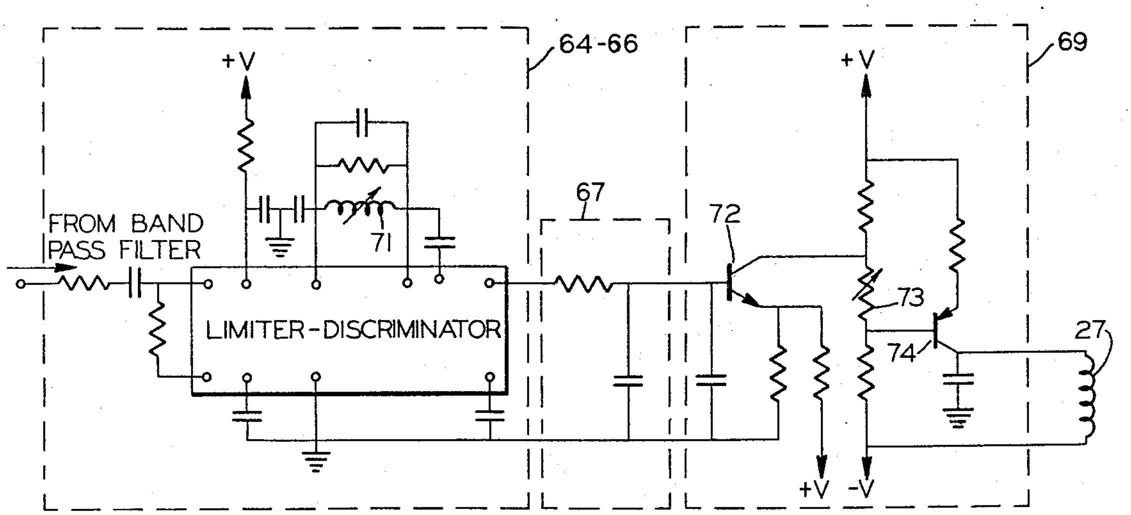
FIG. 2 is a more detailed schematic diagram of the focus control portions of the block diagram of FIG. 1.

FIG. 2 illustrates specific circuitry for a portion of the system of FIG. 1 indicating by dotted lines the combined limiter-discriminator circuit 64–66, the low pass filter circuit 67, and the focus control circuit 69 which in turn is directly coupled to the focusing coil 27. While there are numerous ways to implement the block diagram of FIG. 1, the present preferred embodiment employed an integrated circuit limiter-discriminator type MC1357 connected to function as a quadrature type discriminator having the tuned circuit coil 71 adjustable for fine tuning of the system. A simple RC type low pass filter 67 was employed, and a two transistor amplifier circuit was employed to supply the current to the focusing coil 27. The transistor 74 supplies the focus regulation current, and the transistor 72 functions as a buffer amplifier. This focus control amplifier may also be provided with a calibration control 73 which, once set for a specific piece of equipment, should not require further adjustment by the camera operator.

Figure 4:
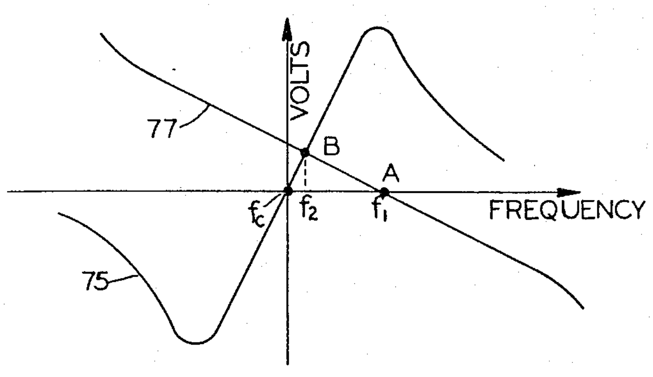
FIG. 4 is a graph superimposing the voltage-frequency characteristics of the image pickup device and of the limiter-discriminator.

The output of the limiter-discriminator as a function of input frequency is depicted as the familiar "S" curve 75 of FIG. 4. Between the two peaks this curve is essentially linear, and beyond the peaks the curve Asymptotically approaches the frequency axis which represents an output of zero volts (or some other reference potential). For a specific Vidicon and filter the control characteristics of the focus regulator (69) on the color carrier output frequency were measured and are superimposed on the plot of FIG. 4 as curve 77. The point B which is common to the two curves and corresponds to a frequency of $f_2$ represents the stable lockup point for this system. Of course the slope of the "S" curve 75 between its peaks can be made quite steep by the appropriate selection of limiter-discriminator circuits as well as changing the gain of the focus control circuit 69 to thus minimize the lockup error $F_C - F_2$.

As noted earlier, variations in the average angle which the actual scan path makes with a true horizontal line and variations in the horizontal scan path length are the significant contributors to a change in the frequency of the color carrier output signal. To determine the relative contribution of these variations the system of FIGS. 1 and 2 was operated so as to provide the desired 3.58 megacycle color carrier output and the scan angle and horizontal path length recorded. The focus coil current was then varied until a 100 kilocycle change in color carrier frequency was detected and the scan angle and horizontal scan length again recorded. For this 100 kilocycle frequency change, the angle changed by one half degree and the horizontal scan length changed by 2.84 percent. 2.84 percent of 3.58 megacycles is about 102 kilocycles which, within the accuracy range of these specific measurements, appears to indicate that the horizontal scan variation accounts for all of the frequency change. Referring to FIG. 7. the scan direction is indicated by the vector S. In the specific filter employed in this experiment the " blue absent" dichroic stripes 39 were inclined to the vertical at an angle $\theta$ of 23°, and the percentage change in wave length (distance between the start of adjacent dichroic stripes) may be easily calculated as:

$$(\cos \theta)/[\cos (\theta - \Delta\theta)] = 0.0037.$$

This corresponds to a frequency change of about 13.2 kilocycles, and thus it appears that the frequency output change is caused primarily by the change in scan path length.

The frequency of the color carrier signal will change with changes in the magnetic focus, the electrostatic focus, or horizontal deflection of the electron beam. Since, as illustrated in the preferred embodiment, we have elected to control the magnetic focus by way of the feedback circuit, these other possible causes of frequency variation should be minimized in some manner. Thus, for example, a simple Zener regulated supply voltage for the electrostatic focus and a yoke current feedback system for the horizontal deflection system to insure a stable peak to peak yoke current may be employed in conjunction with the present embodiment to minimize the other possible sources of change in the color carrier frequency.

While the present invention has been described with respect to a specific embodiment numerous modifications will suggest themselves to those of ordinary skill in the art. Thus, for example, a system quite analogous to that disclosed in FIGS. 1 and 2 may be employed to control the electrostatic focus of an image pickup device. The system may be employed with many types of image pickup devices with either integral or separate color encoding filters and can be used on two or more color carrier type systems if the discriminator is tuned and restricted to only one of those carriers. The system could also be used for a monochrome system if a suitable filter were provided to develop a high frequency carrier during scanning, the frequency variations of which could be monitored. Such a filter would not need to be a dichroic type but would have to develop a sufficiently high frequency so as to not restrict the luminance band width of the monochrome system. Other modifications will suggest themselves to those of ordinary skill in the art, and accordingly the scope of the present invention is to be measured only by that of the appended claims.

I claim:

1. A feedback system for maintaining focus of an electron beam in an image pickup device having a focus control associated therewith comprising:

- means for monitoring the frequency of a carrier signal present in the output of the image pickup device;
- means for providing an electrical signal indicative of the amount by which said frequency deviates from a preselected frequency; and
- means responsive to said electrical signal to selectively vary said focus control.

2. A feedback system for maintaining focus of an electron beam in a one Vidicon color image pickup device employing color encoding optical filter means to cause color information in the form of an amplitude modulated color carrier signal to appear as an output of the image pickup device, the image pickup device having a focus control associated therewith and comprising:

- means for monitoring the frequency of the color carrier signal and for providing a signal indicative of the frequency monitored; and
- means responsive to said indicative signal for supplying a focus correction signal to the image pickup device.

3. The feedback system of claim 2 wherein the means for monitoring comprises:

- a limiter-discriminator circuit for providing as an output said indicative signal; and filter means responsive to the image pickup device output signal for providing the amplitude modulated color carrier signal to said limiter-discriminator.

4. In conjunction with a camera tube for providing video signals including carrier encoded color information signals comprising a pair of phase encoded amplitude modulated signals having a single carrier frequency, a feedback system for automatically adjusting an electron beam focus control of the camera tube comprising:

means for monitoring the said carrier frequency of the color information signals and for providing an output signal indicative of the said carrier frequency including a filter circuit and a detector responsive to the filter circuit output to provide a signal which varies with variations in the camera tube beam current focus; and means responsive to the said output signal for selectively varying the focus control.

5. In conjunction with a camera tube for providing video signals including carrier encoded color information signals, a feedback system for automatically adjusting an electron beam focus control of the camera tube comprising:

means for monitoring a component of the color information signals and for providing an output signal indicative of that component including a filter circuit and a detector responsive to the filter circuit output to provide a signal which varies with variations in the camera tube beam current focus, the detector comprising a discriminator for providing an output signal the magnitude of which represents the amount by which the color information signal carrier frequency differs from a preselected frequency; and means responsive to said output signal for selectively varying the focus control.

6. In combination: an electron beam image pickup device for providing a video output signal, the image pickup device comprising a one vidicon color television camera employing color encoding optical filter means to cause color information in the form of an amplitude modulated color carrier signal to appear as a component of a video output signal;

controllable means for focusing the electron beam within the image pickup device; and means including a first filter, a detector, and a second filter and responsive to the amplitude modulated color carrier signal to provide signals indicative of the amount by which the color carrier signal frequency differs from a predetermined frequency for controlling said focusing means.

7. The combination of claim 6 wherein said responsive means comprises a color carrier band pass filter, a limiter-discriminator circuit, and a low pass filter; said color carrier band pass filter adapted to present only said amplitude modulated color carrier signals to said limiter-discriminator circuit and said limiter-discriminator circuit adapted to provide an output signal which varies with the frequency of the color carrier signal to said low pass filter, said low pass filter thereby supplying focus regulation signals to said controllable means.

8. The combination of claim 7 wherein the low pass filter is adapted to pass only relatively slowly changing output signals from the limiter-discriminator to thereby control the loop transient response of the feedback system.

* * * * *